(No Model.)  2 Sheets—Sheet 1.
L. S. HOGEBOOM.
DUST COLLECTOR.
No. 530,642.  Patented Dec. 11, 1894.
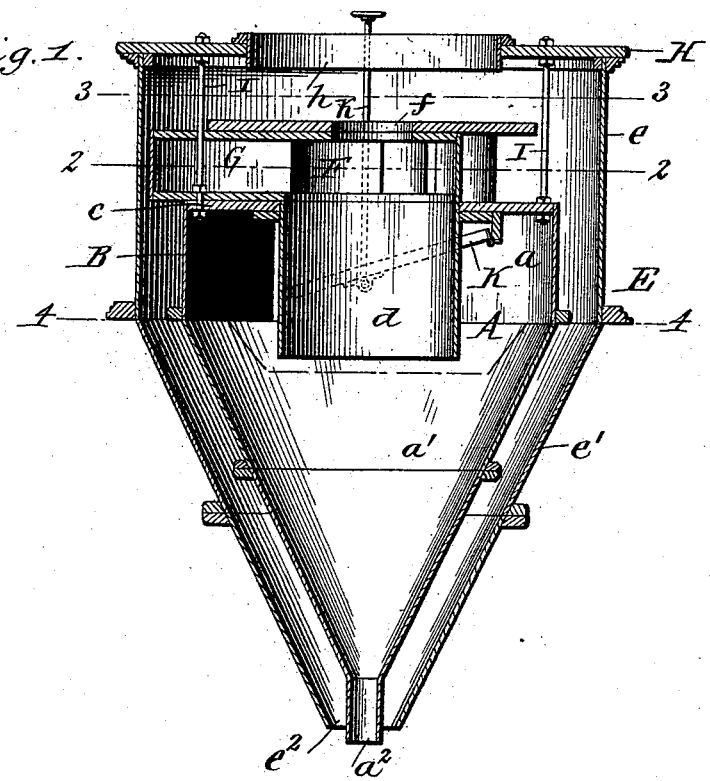
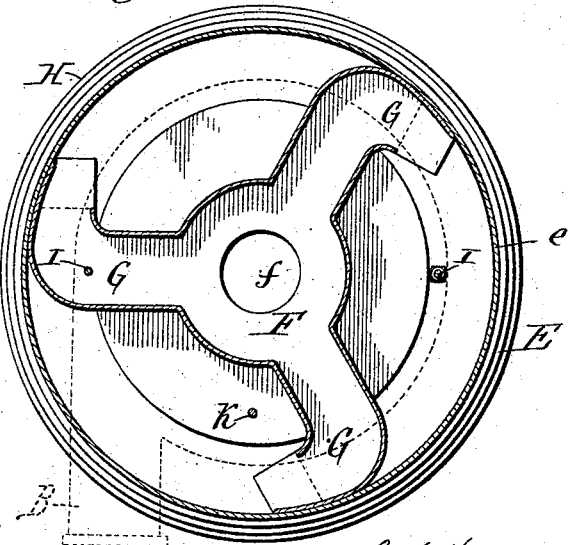
Witnesses:
Emil Neukart.
Chas. F. Burkhardt.
L. S. Hogeboom, Inventor.
By Wilhelm Bonner
Attorneys.
THE NORRIS PETERS CO., PHOTO-LITHO., WASHINGTON, D. C.

(No Model.) 2 Sheets—Sheet 2.

L. S. HOGEBOOM.
DUST COLLECTOR.

No. 530,642. Patented Dec. 11, 1894.

Witnesses:
Emil Neuhart.
Chas. F. Burkhardt.

Levi S. Hogeboom, Inventor.
By Wilhelm Bonner,
Attorneys.

UNITED STATES PATENT OFFICE.

LEVI S. HOGEBOOM, OF THREE RIVERS, ASSIGNOR TO THE KNICKERBOCKER COMPANY, OF JACKSON, MICHIGAN.

DUST-COLLECTOR.

SPECIFICATION forming part of Letters Patent No. 530,642, dated December 11, 1894.

Application filed September 13, 1894. Serial No. 522,867. (No model.)

*To all whom it may concern:*

Be it known that I, LEVI S. HOGEBOOM, a citizen of the United States, residing at Three Rivers, in the county of St. Joseph and State of Michigan, have invented a new and useful Improvement in Dust-Collectors, of which the following is a specification.

This invention relates to that class of dust collectors which are operative by reason of the vortical action of a whirling body of dust laden air in a separating chamber having an imperforate peripheral wall.

The object of my invention is to increase the efficiency of the dust collector and to provide means for separating and collecting the small percentage of very fine dust which under some conditions escapes from the dust collector with the outgoing current of purified air.

Figure 3:
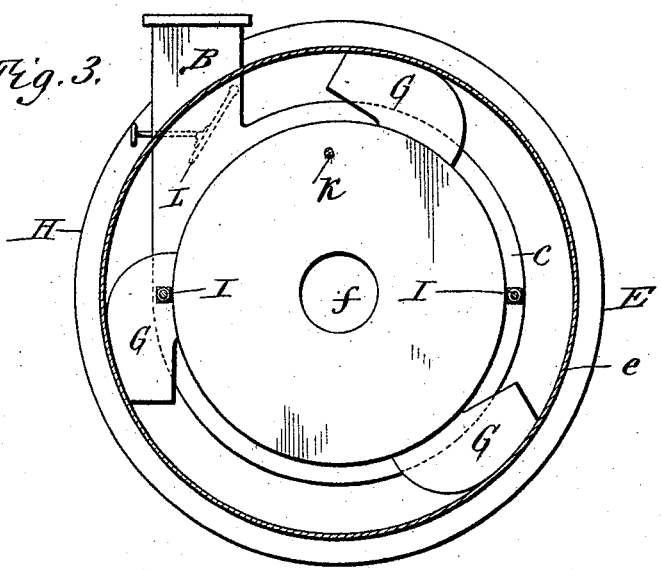
Figure 4:
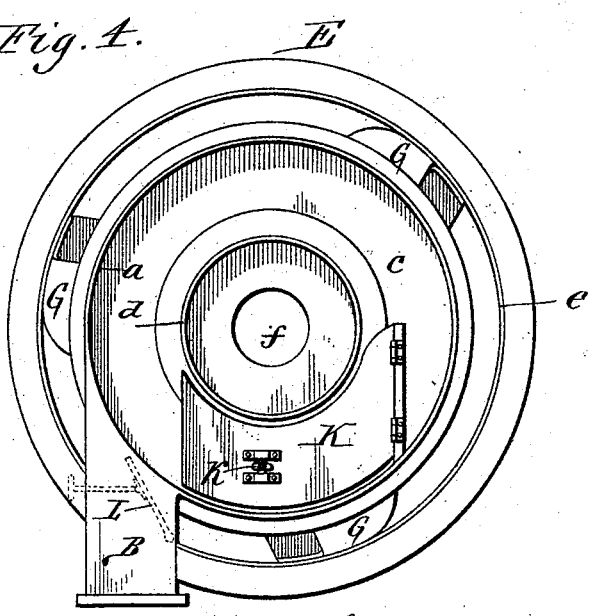

In the accompanying drawings consisting of two sheets:—Figure 1 is a sectional elevation of a dust collector provided with my improvements. Fig. 2 is a horizontal section in line 2—2, Fig. 1, looking upward. Fig. 3 is a horizontal section in line 3—3, Fig. 1, looking downward. Fig. 4 is a horizontal section in line 4—4, Fig. 1, looking upward.

Like letters of reference refer to like parts in the several figures.

A represents an internal or primary dust collector of the kind now generally known as a "Cyclone" dust collector, having its separating chamber composed of an upper cylindrical portion $a$, and a lower conical portion $a'$ provided at its small end with an opening $a^2$ for the discharge of the separated solid matter, and having a tangential inlet spout B for the dust laden air entering the upper cylindrical portion of the separating chamber, a top plate or head $c$, and a depending tubular guard $d$ arranged centrally in the latter for the escape of the purified air. These parts constitute in themselves a complete dust collector and may be constructed and arranged in any well known or suitable manner.

E represents a secondary dust collector which incloses the primary dust collector and which receives the outer part of the current of purified air escaping from the tubular guard of the primary dust collector and subjects this air to a further separating action of the same general nature as that to which the dust laden air is subjected in the primary dust collector. The separating chamber of this secondary dust collector consists of an upper cylindrical part $e$ and a lower conical part $e'$ having at its lower end a discharge opening $e^2$ for the separated solid matter. The walls of the outer secondary dust collector are arranged at a sufficient distance outwardly from the walls of the inner primary dust collector to enable an effective whirling movement of the air to be established in the outer secondary dust collector.

F represents a superposed air receiving chamber arranged upon the top plate $c$ of the primary dust collector for the purpose of receiving and separating from the outgoing current of air that portion of the air current which requires further separation in the secondary dust collector. This chamber is provided in its top plate with a central opening $f$ which is made so much smaller in diameter than the tubular guard $d$ of the primary dust collector, that only the inner portion of the current of air which escapes from the tubular guard can escape through the opening $f$, while the outer portion of this outgoing current of air passes with a whirling motion into the chamber F and escapes from the latter laterally through one or more discharge spouts G applied to the peripheral wall of the chamber F. These spouts have their outer ends or nozzles bent or curved so as to deliver the air currents tangentially into the upper portion of the secondary separating chamber.

I prefer to employ three of these air discharge spouts, as shown, and I prefer to make the aggregate area of these three spouts somewhat larger than that of the tangential inlet spout, so that the air can expand in passing to the secondary dust collector in about the same proportion in which the dust separating surface of the outer dust collector is larger than that of the inner dust collector.

H represents the top plate or head of the secondary dust collector provided centrally with a short tubular guard $h$, through which the purified air currents from the primary as well as from the secondary dust collector finally escape.

The inner primary dust collector may be secured within the outer secondary dust collector by rods I, or other suitable means. The dust laden air enters the inner primary dust collector through the tangential spout B, which penetrates the outer secondary dust collector. The dust laden air forms a whirling body in the inner dust collector and throws off the solid matter in a well known manner, the separated solid matter escaping with very little air through the small opening at the lower end of the separating chamber. The purified air moves with a spiral motion upwardly through the tubular guard of the inner dust collector and the inner annular layer or portion of the outgoing current of air, which portion is free from solid matter, escapes directly upwardly through the opening $f$ of the superposed air chamber F and through the tubular guard $h$ of the outer dust collector. The outer annular layer of this outgoing spiral current of air, which portion may contain some fine dust particles, is skimmed off by the top plate of the superposed air chamber and sent into the outer or secondary dust collector by the discharge spouts G of that chamber. The volume of air which is so cut off from the outgoing air current and taken into the secondary dust collector before it is allowed to escape from the machine, is given a whirling or rotative movement in the outer dust collector, whereby a further separation and collection of dust is effected. The separated solid matter escapes through the opening at the lower end of the outer dust collector which opening surrounds that of the inner dust collector and the purified air escapes finally in an upward direction through the tubular guard of the outer dust collector. By this means the outgoing current of purified air escaping from the main or primary dust collector is separated into two parts, the inner part, which is pure, being allowed to escape without further separation into the outer air, while the outer part, which may contain some dust, is subjected to a further separation in a similar dust collector, which, however, surrounds or incloses the main dust collector, so that the machine is very simple, compact and efficient.

K represents a valve which is hung to the under side of the top plate of the main dust collector, between the peripheral wall thereof and the tubular guard and which is arranged on that side of the tangential inlet spout which is reached by the whirling air current after it has made one turn of the separating chamber. This valve is so hung that its free end points toward the tangential inlet spout and can be adjusted, up or down, by a rod $k$. After the air current has made one turn in the separating chamber it strikes the under side of this valve and is thereby deflected downwardly whereby the interference of the whirling body of air in the separating chamber with the incoming current of air is avoided. By raising or lowering this valve the air current can be controlled according to the nature of the material which is carried on the air current.

In some instances a valve L placed in the tangential inlet spout, and shown in dotted lines in Fig. 4, is desirable for restricting the air current and deflecting it toward the peripheral wall of the separating chamber.

I claim as my invention—

1. The combination with a primary dust collector, having a tangential inlet spout, an air outlet and a dust outlet, of a surrounding secondary dust collector having an air outlet and a dust outlet, and an air chamber interposed between the air outlet of the primary dust collector and the secondary dust collector, said chamber discharging part of the air from the machine and delivering the rest of the air into the secondary dust collector for further separation, substantially as set forth.

2. The combination with the primary dust collector having a tangential inlet spout, an air outlet and a dust outlet, of a surrounding secondary dust collector having an air outlet and a dust outlet, and an air chamber arranged within the secondary dust collector and above the air outlet of the primary dust collector and having an air outlet between the air outlets of the two dust collectors and a peripheral discharge spout opening into the secondary dust collector, substantially as set forth.

3. The combination with the primary dust collector, having a tangential inlet spout, an air outlet provided with a tubular guard and a dust outlet, of a secondary dust collector having an air outlet provided with a tubular guard and a dust outlet, and an air chamber which is arranged above the air outlet of the primary dust collector and which has an air outlet of smaller diameter than that of the primary dust collector, and a peripheral discharge spout opening into the secondary dust collector, substantially as set forth.

Witness my hand this 11th day of September, 1894.

LEVI S. HOGEBOOM.

Witnesses:
JNO. J. BONNER,
E. R. WEAN.